United States Patent Office 2,710,267
Patented June 7, 1955

2,710,267

PROCESS OF COATING GLASS WITH A TITANIUM POLYMER AND ARTICLE PRODUCED THEREBY

Thomas Boyd, Springfield, and Robert M. Dickey, North Wilbraham, Mass., assignors to Monsanto Chemical Company, St. Louis, Mo., a corporation of Delaware No Drawing. Application June 17, 1950, Serial No. 168,853

13 Claims. (Cl. 117—124)

This invention relates to coated glass surfaces. More particularly, the invention relates to glass surfaces carrying a coating of a condensation polymer of an organo titanium compound.

It is frequently desirable to coat glass articles such as fibers, filaments, bats, fabrics, sheets, windshields, lenses, etc. to change the surface characteristics of the glass. For some purposes, the coatings should act as lubricants; for others as a non-fogging agent; for still others as a non-reflecting surface, etc. The coatings should be resistant to chemical media and to heat and should be easy to apply. Many coating materials have been suggested, most of which are deficient in one or more of the critical features desired.

One object of this invention is to provide a coated glass surface.

A further object is to provide a coated glass which is non-wettable by aqueous media.

Another object is to provide a coated glass which is non-reflecting.

Still another object is to provide temperature and chemical resistant sized glass fabrics and bats.

A still further object is to provide glass coated with a strongly-adherent, water-insensitive polymeric coating derived from a straight-chain polymer of a tetraorgano derivative of orthotitanic acid.

These and other objects are attained by coating a glass surface with an anhydrous organic solvent solution of a straight-chain polymer of a tetraorgano derivative of orthotitanic acid, removing the solvent and reacting the straight-chain polymer with water to thereby form a polymeric, strongly-adherent, water-insensitive coating on the glass surface.

The following examples are given in illustration and are not intended as limitations on this invention. Where parts are mentioned, they are parts by weight.

Example I

A glass filament is prepared by the conventional process of forcing molten glass through a small orifice into cool air. The filament, being of relatively small diameter, is soon cooled to about room temperature. Thereafter, the filament is passed through a toluene solution of a polymer of tetrabutyl ortho titanate containing about 1% polymer by weight. The speed of the coating operation is governed so as to deposit on the glass a film of polymer about 0.1 mil thick. The coated filament is then passed through a humid atmosphere at room temperature (20–35° C.). The resultant coated filament is not wetted by water or other aqueous media. The coating is nearly as hard as the glass but is still flexible enough so that the glass filament can be woven or prepared into glass mats without disrupting the coating. On testing the tensile strength of the coated filament and comparing the results with tests made on the uncoated filament, it is found that there is substantially no change.

Example II

A glass filament is passed through an xylol solution of polymeric tetrastearyl ortho titanate containing about 1% of the polymer by weight at such a rate as to pick up a coating about 1.0 mil thick. The coated filament is subjected briefly to a humid atmosphere at room temperature and then examined for tensile strength and wettability. The filament is not wetted by aqueous media and retains substantially all of the tensile strength of the original glass filament. It is further noted in this case that the filament has a waxy feel and slides over adjacent glass surfaces bearing the same type of coating without the development of frictional heat. In other words, this coating has the additional advantage that it has lubricating properties. Furthermore, the coating was resistant to elevated temperatures up to the softening point of the glass.

Example III

A pane of glass is thoroughly cleaned and then dipped into an xylol solution of polymeric tetrabutyl ortho titanate containing about 0.001% by weight of the polymer. Excess solution is allowed to drain from the surface which is then exposed to a humid atmosphere. The resultant coated glass is not wetted by aqueous media and the surfaces thereof are substantially non-reflecting. The coated glass may be used as a window pane or it may be laminated with another coated pane of glass and a polyvinyl acetal resin to provide laminated glass for automobile windshields. Laminated glass thus made shows greater adhesion to the plastic interlayer than when uncoated glass is used.

Example IV

An automobile windshield is spray-coated with an extremely thin coating of a polymeric tetrabutyl ortho titanate using a 0.0001% solution of the polymer in xylol-butanol solvent. As soon as the solvent evaporates the polymer coating is subjected to a stream of humid air for about one minute. A hard, transparent, tough coating about 5.0 microns thick is obtained which cuts down the reflection from the glass surfaces by more than 50%. Windshields thus coated reduce the eyestrain of driving since glare from reflection of light from the windshield surfaces is greatly reduced.

The coatings of this invention are condensation polymers of organic derivatives of titanium which are described and claimed in copending application Serial No. 122,844 filed October 21, 1949, now abandoned.

The polymers there described are prepared by reacting 0.5 to 1.5 mols of water with 1 mol of a tetraorgano derivative of orthotitanic acid at room temperature in an otherwise anhydrous inert organic solvent such as an aromatic or aliphatic hydrocarbon or a halogenated hydrocarbon. Thus, for example, as is shown in Example I of S. N. 122,844, when tetra-n-butyl orthotitanate is dissolved in anhydrous butanol and about 0.9 mol of water per mol of orthotitanate is added thereto and the resultant solution is maintained at about 30° C. for 24 hours, there is obtained on vacuum distillation of the solvent a residual transparent liquid polymeric product having a viscosity of about 5–25 poises.

The polymers prepared by the process described in the aforesaid application S. N. 122,844 range from liquids to hard solids depending on the starting derivative of orthotitanic acid and the amount of water used. In general, if 0.5 mol of water is used, the product is essentially a dimer. As more water is used, longer straight-chain polymers are formed until the amount of water becomes greater than 1 mol per mol of orthotitanic derivative. At this point a substantial amount of cross-linking takes place, the viscosity of the polymers rises abruptly and the majority of the resulting polymers are solids. The polymers to be used as starting materials in accordance with the present invention are the straight-chain polymers of tetraorgano derivatives of orthotitanic acid prepared by reacting each mol of the tetraorgano derivative with 0.5–1 mol of water. The straight-chain polymers are cross-linked by further reaction with water.

The preferred polymers are polymers of saturated alkyl esters of ortho titanic acid such as the tetramethyl, ethyl, butyl, isobutyl, pentyl, octyl, lauryl, cetyl, stearyl, etc. esters. Unsaturated esters such as vinyl, allyl and methallyl esters may be used also. It is also possible to employ the mixed anhydrides of ortho titanic acid with mono or polybasic acids such as titanium tetraphthalate, titanium tetraacetate, etc. and the amides of ortho titanic acid such as the tetrabutyl amide of ortho titanic acid. The polymerization process is to be distinguished from polymerization through the instrumentality of unsaturated groups such as allyl, vinyl, acetylenic, etc. groups since the polymers are condensation products and are not addition polymers such as are produced by polymerization through unsaturated groups.

The coatings must be applied from substantially anhydrous organic solvent solutions. The solvents may be alcohols, hydrocarbons, or chlorinated hydrocarbons, or mixtures of these. Generally, it is preferable to use the solvent in which the polymer is prepared as the medium for application of the polymer as a coating. For practical and economical reasons, a combination of two or more solvents may be desirable.

After the coating is applied to the glass, the solvent is allowed to evaporate and thereafter the polymer is subjected to water or a moist atmosphere for a short time, which may vary according to the thickness of the coating. Normally exposures of from one to five minutes are sufficient to harden the coating and set it in its permanent form.

The amount of polymer applied to the glass depends somewhat on the end use of the glass. For glass fibers and filaments, it is desirable to have a coating of 0.01–2.0 mils thickness. Where the main purpose of the coating is to reduce reflectance from the glass surfaces, the coating should be 1–10 microns in thickness.

The titanium polymers of this invention range from crystal clear to solid white in color, from extremely hard to soft and waxy in texture. They are strongly adherent to glass and the majority of them cannot be removed from the glass by any means except abrasive action. After being set by the action of water, the coatings are impervious to and non-wettable by water and aqueous media. They are not attacked by alkaline or acid media, and are unaffected by organic solvents. They are not decomposed at elevated temperatures. The waxy polymers tend to lubricate the glass; a property which is especially desirable in the sizing of glass yarns and filaments, bats and fabrics.

Glass bats and fabrics sized with the titanium condensation polymers are particularly valuable since the size is resistant to temperature as well as to chemical reagents. Thus, titanium polymer-sized glass bats and fabrics may be used as table mats, ironing board covers, etc. without danger that hot objects placed thereon will decompose the size, causing discoloration.

The coatings of this invention are advantageous for the sizing of glass filaments and yarns and for the treatment of other glass surfaces to reduce reflection of light therefrom and to render the surfaces non-wettable by water. They may be used in automobile windshields to substantially reduce glare without reducing the light transmission of the glass. They may be used to coat lenses for use in cameras, binoculars, telescopes and other optical instruments to reduce interference with the optical properties of the glass by surface reflectance. They may be used to coat store windows to reduce reflections so that the merchandise displayed behind the glass front will be more attractively set out. They may be used to coat spectacle lenses to substantially reduce the fogging of the lenses due to atmospheric moisture.

The coatings of organo titanium condensation polymers may also be applied to decorative glass articles and to glass blocks and to other vitreous materials. By reducing reflection from decorative articles, the beauty thereof is greatly enhanced.

It is obvious that many variations may be made in the products and processes of this invention without departing from the spirit and scope thereof as defined in the appended claims.

What is claimed is:

1. Glass carrying on the surface thereof a continuous transparent strongly adherent pigment-free water-insensitive coating comprising the polymeric condensation product of water and a straight-chain polymer of a tetraorgano derivative of orthotitanic acid.

2. A process for coating glass which comprises coating glass with a substantially anhydrous pigment-free organic solvent solution of a straight-chain polymer of a tetraorgano derivative of orthotitanic acid, evaporating the solvent and reacting the polymer with water to form a continuous transparent strongly-adherent water-insensitive coating on the glass.

3. Glass as in claim 1 wherein the glass is in the form of a filament.

4. Glass as in claim 1 wherein the glass is in the form of a sheet.

5. Glass as in claim 1 wherein the tetraorgano derivative is a saturated alkyl derivative of orthotitanic acid.

6. Glass as in claim 5 wherein the saturated alkyl derivative of orthotitanic acid is tetrabutyl orthotitanate.

7. Glass as in claim 1 wherein the tetraorgano derivative is tetrastearyl orthotitanate.

8. Glass as in claim 1 wherein the tetraorgano derivative is a mixed anhydride of orthotitanic acid and an organic acid.

9. Glass as in claim 1 wherein the tetraorgano derivative is a tetra amide of orthotitanic acid.

10. A process as in claim 2 wherein the glass is coated by being passed through the polymer-containing solvent solution.

11. A process as in claim 2 wherein the glass is coated by being dipped into the polymer-containing solvent solution.

12. A process as in claim 2 wherein the glass is coated by being sprayed with the polymer-containing solvent solution.

13. A process as in claim 2 wherein the polymer is reacted with water by exposure to a humid atmosphere.

References Cited in the file of this patent

UNITED STATES PATENTS

| | | |
|---|---|---|
| 2,466,642 | Larsen | Apr. 5, 1949 |
| 2,530,635 | Sowa | Nov. 21, 1950 |

FOREIGN PATENTS

| | | |
|---|---|---|
| 125,450 | Australia | Sept. 12, 1947 |

OTHER REFERENCES

Ellis, The Chemistry of Synthetic Resins, vol. 2, 1935, Reinhold Pub. Corp., New York City, N. Y. Pg. 1239.

Journal Oil & Colour Chemists Assn., vol. 31, No. 340, 1948, pp. 405–410.

Esters of Titanium by Kraitzer, K. McTaggart and G. Winter.